C. B. SHELDON.
Table Casters.

No. 141,390. Patented July 29, 1873.

Witnesses:
G. Martins
Solon C. Kemon

Inventor:
Cevedra B. Sheldon
Per _____
Attorneys.

UNITED STATES PATENT OFFICE.

CEVEDRA B. SHELDON, OF NEW YORK, N. Y.

IMPROVEMENT IN TABLE-CASTERS.

Specification forming part of Letters Patent No. 141,390, dated July 29, 1873; application filed June 17, 1873.

*To all whom it may concern:*

Be it known that I, CEVEDRA B. SHELDON, of the city, county, and State of New York, have invented a new and Improved Table-Caster; and I do hereby declare that the following is a full, clear, and exact description of the same, reference being had to the accompanying drawing forming a part of this specification, in which—

Figure 1:
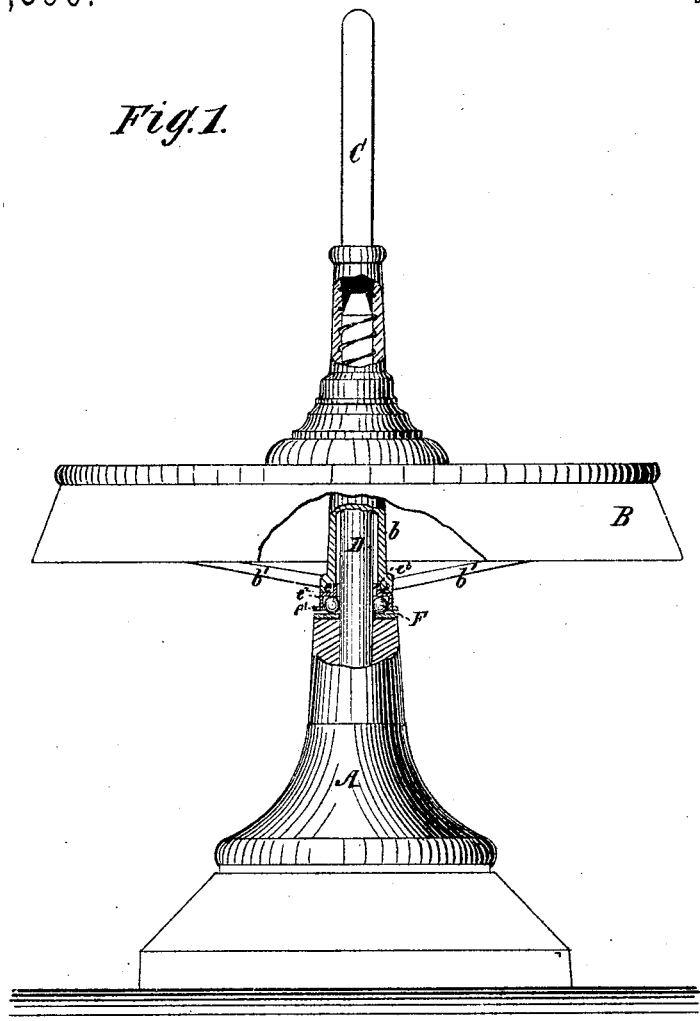
Figure 2:
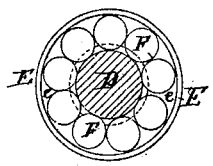

Figure 1 is a side elevation, partly broken away. Fig. 2 is a horizontal section through the line $x\ x$ of Fig. 1.

The invention relates to casters and analogous devices, having a seat or holder that is allowed to rotate on its stand or support. It consists in converting nearly all the sliding friction which is usually created by the surface contact of the holder and the bolt, into rolling friction, by making the guide-tube bear against the bolt only at the top, and causes the enlarged bottom to bear on the outside of the bearing-plate that moves on and with subjacent anti-friction rolls. It consists also in a peculiar construction of the bearing-plate to enable it to embrace and work against the outer side of the balls, whereby the plate itself is prevented altogether from contact with the bolt and, therefore, from all sliding friction.

In the drawing, A represents a caster-stand, B the caster-holder, and C the handle by which it is lifted. It is made in three pieces, so as to be conveniently taken apart and cleaned. D is the bolt that uprises from the stand, and is end-threaded to work in a corresponding nut-screw in the socket of handle C. The caster-holder has a guide-tube, $b$, with braces $b'$. The construction of this tube is peculiar and important, because its object is to reduce the friction which usually occurs against the bolt D. For this purpose I make this tube conical on the inside or enlarged so as to bind only at its upper end on the bolt. It is further enlarged toward the lower end, and there chambered, so as to embrace the step or convexity $e$ of the plate E that bears upon a continuous series of loose anti-friction balls, F, in the groove of top of stand A. A simple bearing-plate, with horizontal faces, might be used in place of the plate E, but by concaving the latter on the under side, and causing the angle formed by flange $e^1$ with the concavity or inverted cup $e$ to bear on the outside of balls, making the hole $e^2$ larger than bolt D, I avoid entirely the necessity of allowing this cup-plate E to work against the bolt. Of course the flange $e^1$ is not an essential, but makes a better finish. This throws all the friction upon the balls, no matter how much greater the weight may be on one side of the caster-holder than on the other.

By this construction all sliding friction is converted into rolling friction, this, of course, being the object of all anti-friction devices.

There is a pin or rivet passed transversely through the bolt D, to prevent the plate E from rising upwardly.

Having thus described my invention, what I claim as new, and and desire to secure by Letters Patent, is—

1. The combination with balls and standard of a bearing-plate, E, for the caster-holder, consisting of the inverted cup $e$ with hole $e^2$, to bring the bottom edge of said cup on the outer side of the balls, to take the bearing-plate entirely out of contact with the bolt, and thus throw all the friction on the balls, in the manner set forth.

2. The socket $b$, enlarged so as to have a bearing on bolt only at the top, in combination with the cup $e$ having a bearing on the outside of bolts, but not touching bolt, to produce a minimum of sliding friction, in the manner set forth.

CEVEDRA B. SHELDON.

Witnesses:
SOLON C. KEMON,
CHAS. A. PETTIT.